(12) United States Patent
Nanri et al.

(10) Patent No.: US 9,338,434 B2
(45) Date of Patent: May 10, 2016

(54) PARALLAX CALCULATION METHOD AND PARALLAX CALCULATION DEVICE

(71) Applicant: PANASONIC CORPORATION, Osaka (JP)

(72) Inventors: Takuya Nanri, Kanagawa (JP); Hirofumi Nishimura, Kanagawa (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 79 days.

(21) Appl. No.: 14/249,721

(22) Filed: Apr. 10, 2014

(65) Prior Publication Data

US 2014/0218485 A1 Aug. 7, 2014

Related U.S. Application Data

(63) Continuation of application No. 13/125,108, filed as application No. PCT/JP2010/005416 on Sep. 2, 2010, now Pat. No. 8,743,183.

(30) Foreign Application Priority Data

Sep. 7, 2009 (JP) .................................. 2009-205466

(51) Int. Cl.
*H04N 13/02* (2006.01)
*G01S 11/12* (2006.01)
(Continued)

(52) U.S. Cl.
CPC ................ *H04N 13/02* (2013.01); *G01S 11/12* (2013.01); *G06T 7/0075* (2013.01); *G08G 1/16* (2013.01); *G08G 1/165* (2013.01); *G08G 1/168* (2013.01); *G06T 2207/30261* (2013.01)

(58) Field of Classification Search
CPC ................. G01S 11/12; G06T 7/0075; G06T 2207/30261; H04N 13/02; G08G 1/165; G08G 1/168; G08G 1/16
USPC .......................................................... 348/47
See application file for complete search history.

(56) References Cited

U.S. PATENT DOCUMENTS 5,937,079 A 8/1999 Franke
7,313,265 B2 12/2007 Nakai et al.
(Continued)

FOREIGN PATENT DOCUMENTS

CN 101262619 9/2008
DE 19636028 11/1997
(Continued)

OTHER PUBLICATIONS

International Search Report, mailed Nov. 9, 2010, for corresponding International Application No. PCT/JP2010/005416.
(Continued)

*Primary Examiner* — Jamie Atala
*Assistant Examiner* — Nguyen Truong
(74) *Attorney, Agent, or Firm* — Greenblum & Bernstein, P.L.C.

(57) ABSTRACT

A disparity calculation apparatus for a stereo camera implements ranging of an object that includes consecutive similar patterns. In stereo matching, if a plurality of corresponding point candidates are present in a sum of absolute differences or similar evaluation value distribution for a target point, an evaluation value map is generated by superimposing an evaluation value distribution of a target point, for which a plurality of corresponding points are determined to be present, and an evaluation value distribution of each other target point present in a peripheral area of that target point. The shape of an object is represented in real space around a target point for which a plurality of corresponding points are determined to be present. The true distance of a railing that extends in a straight line is determined by extracting a line segment with the strongest linearity in the evaluation value map.

4 Claims, 12 Drawing Sheets

(51) Int. Cl.
*G06T 7/00* (2006.01)
*G08G 1/16* (2006.01)

(56) References Cited

U.S. PATENT DOCUMENTS

| | | |
|---|---|---|
| 2003/0227378 A1 | 12/2003 | Nakai et al. |
| 2007/0255480 A1 | 11/2007 | Southall et al. |
| 2009/0010495 A1 | 1/2009 | Schamp et al. |
| 2012/0045119 A1 | 2/2012 | Schamp |

FOREIGN PATENT DOCUMENTS

| | | |
|---|---|---|
| JP | 5-141919 A | 6/1993 |
| JP | 7-152914 A | 6/1995 |
| JP | 2000-348175 A | 12/2000 |
| JP | 2001-351200 A | 12/2001 |
| JP | 2007-85773 A | 4/2007 |
| WO | 2006/014974 | 2/2006 |

OTHER PUBLICATIONS

Jung et al., "Stereo Vision-Based Forward Obstacle Detection", XP055049129, (Retrieved from Internet URL:http://citeseerx.ist.psu.edu/viewdoc/download?doi=10.1.1.159.6930&rep=rep1&type=pdf on Jan. 10, 2013), Jan. 1, 2007.

Frank Pagel, "A Segment and Fusion-Based Stereo Approach", Canadian Conference on Computer and Robot Vision, 2009. CRV '09., IEEE, Piscataway, NJ, USA , XP031524554, May 25, 2009, pp. 170-177.

Extended European Search Report from European Patent Ofice (E.P.O.), mailed Jan. 21, 2013, for corresponding European Patent Application.

China Search Report (English language translation thereof), which is an Annex to Chinese Office Action, dated Oct. 31, 2014, for the corresponding Chinese Patent Application.

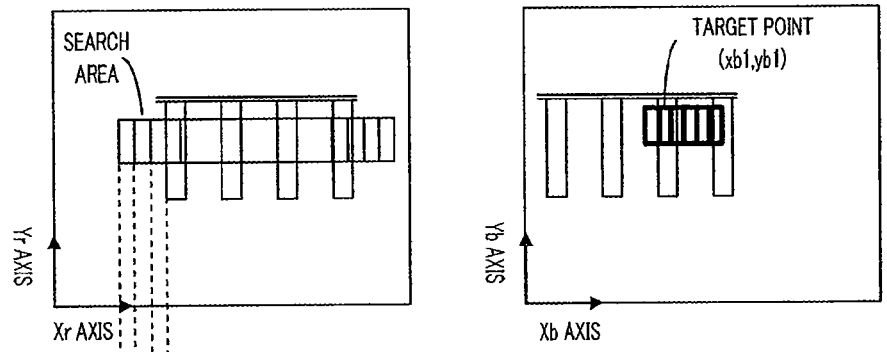
FIG.8B
FIG.8A
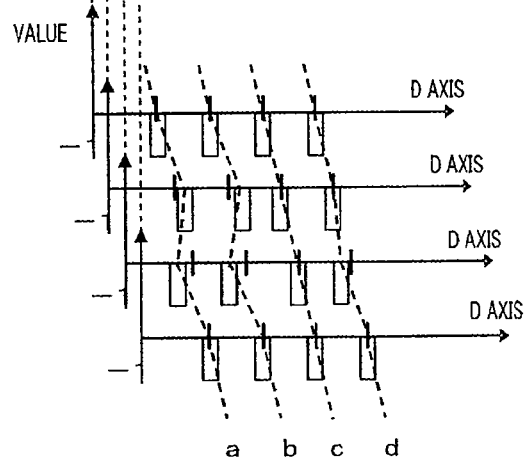
FIG.8C
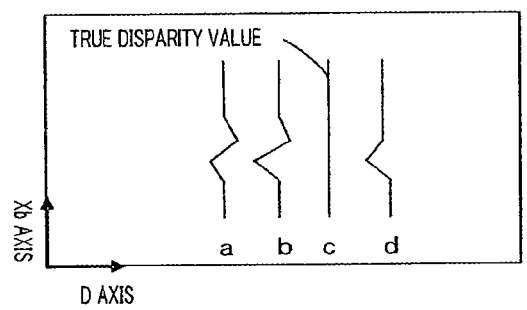
FIG.8D

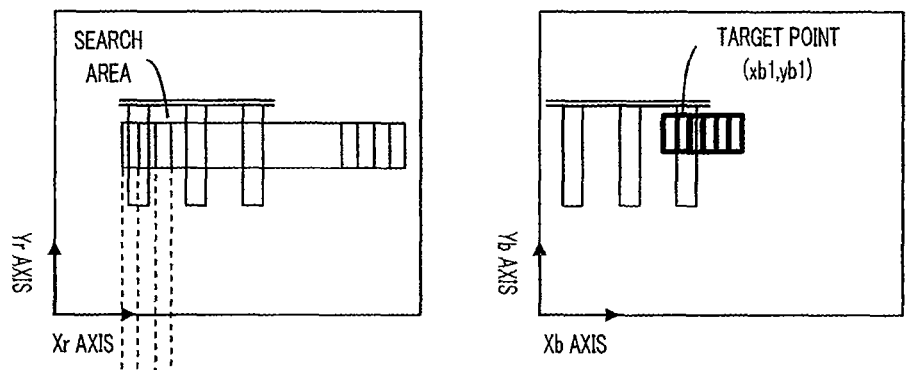
FIG.9B
FIG.9A
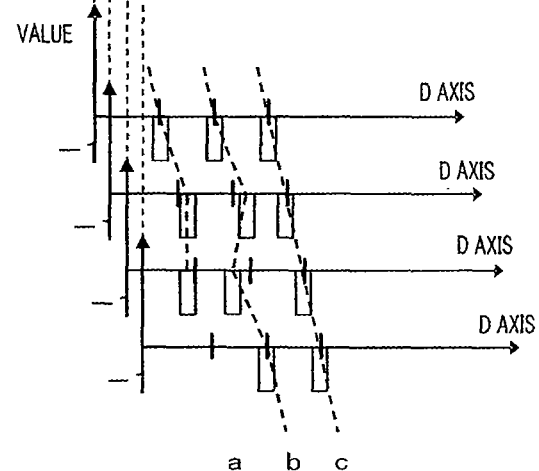
FIG.9C
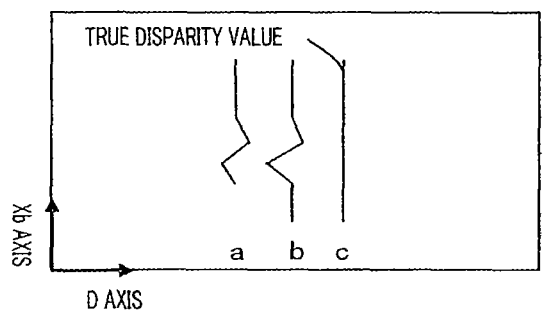
FIG.9D

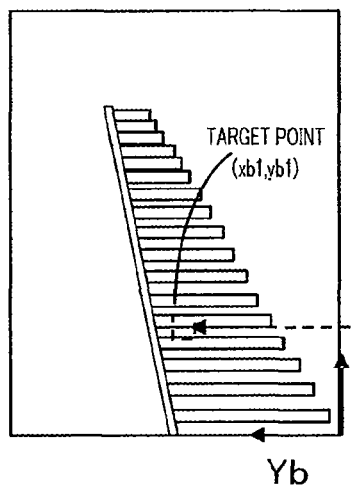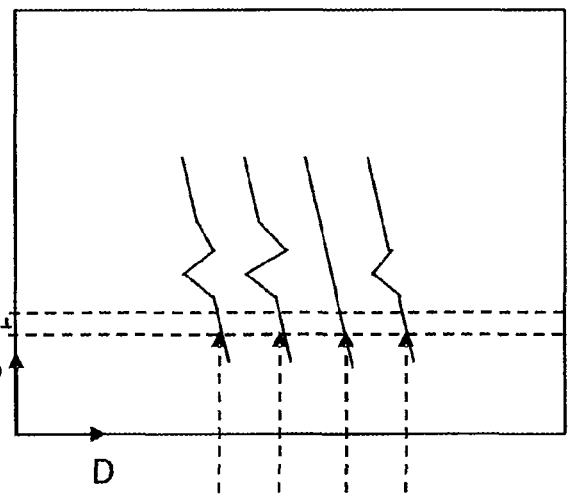
FIG.10B          FIG.10A
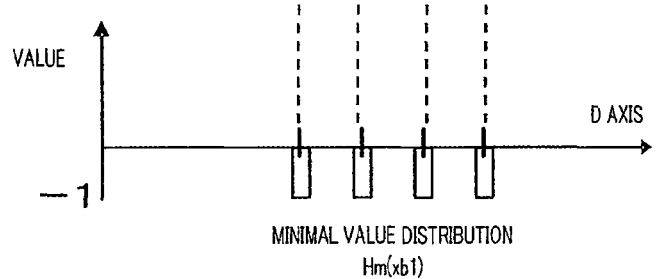
FIG.10C

FIG.11A

MINIMAL VALUE DISTRIBUTION Hm(Xb)

PARALLAX CALCULATION METHOD AND PARALLAX CALCULATION DEVICE

CROSS-REFERENCE TO RELATED APPLICATION

This application is a continuation of pending U.S. patent application Ser. No. 13/125,108, filed Apr. 20, 2011 which is a National Stage Application of International Application No. PCT/JP2010/005416, filed Sep. 2, 2010, which claims priority to Japanese Application No. 2009-205466, filed Sep. 7, 2009, which are expressly incorporated herein by reference in their entireties.

TECHNICAL FIELD

The present invention relates to the field of a method and apparatus that perform disparity calculation by means of stereo matching using an in-vehicle stereo camera for ranging and detecting a vehicle in front of a vehicle in question, or an object present in a road environment such as a pedestrian, wall, railing, shrubbery, or the like.

BACKGROUND ART

Stereo matching involves searching for a corresponding point corresponding to each point of target image data that is stereo image data captured by one lens among stereo image data obtained by capturing a target object by means of a stereo camera incorporating two lenses from a search area of reference image data that is stereo image data captured by the other lens. The corresponding point determination method generally used is a method whereby a small area centered on a target point that is a target image data point is extracted, the extracted small area and a small area within a search area are compared, and whether or not image brightness patterns of the small areas are similar is determined using an evaluation value criterion such as an image brightness sum of absolute differences (SAD), sum of squared differences (SSD), normalized cross correlation (NCC), or the like.

However, if target objects include an object that includes consecutive similar patterns, such as a crosswalk, railing, or the like in which a bar-shaped or rectangular pattern is repeated, with SAD, SSD, or NCC a plurality of corresponding point candidates are calculated, and it is difficult in principle to calculate a true corresponding point.

As a conventional countermeasure even in a case in which a plurality of corresponding point candidates are calculated, there is a method whereby a corresponding point of the target point is considered to be unknown, and is not output (see Patent Literature 1, for example). There is also a method whereby a corresponding point is selected according to a control mode of applications, such as pre-crash control, inter-vehicle distance control involving a vehicle ahead, parking assist control, and so forth (see Patent Literature 2, for example). FIG. 12 shows a conventional stereo matching system described in Patent Literature 2.

In FIG. 12, stereo image data acquisition section 1202 acquires target image data captured by one lens and reference image data captured by another lens as a pair of image data captured simultaneously by a stereo camera incorporating two lenses.

Stereo matching section 1203 calculates a degree of difference between each point of target image data and a search point within a reference image data search area by means of SAD, and calculates a set of degrees of difference within the search area as an evaluation value distribution. Corresponding point candidate plurality presence determination section 1204 determines from the evaluation value distribution whether or not a plurality of corresponding point candidates are present.

Minimal evaluation value corresponding point calculation section 1205 calculates a search point for which an evaluation value that is a degree of difference of image brightness is minimal as a corresponding point candidate for a target point for which a plurality of corresponding point candidates are determined not to be present. Control mode data acquisition section 1206 acquires control mode data denoting a control mode.

For a target point for which a plurality of corresponding point candidates are determined to be present, control mode corresponding point calculation section 1207 selects the most distant corresponding point candidate if the control mode is pre-crash control, selects the nearest corresponding point candidate if the control mode is inter-vehicle distance control, and selects the nearest corresponding point candidate if the control mode is parking assist control.

Disparity data output section 1208 substitutes a corresponding point with the smallest evaluation value for a target point for which a plurality of corresponding point candidates are determined not to be present, substitutes a corresponding point selected according to the control mode for a target point for which a plurality of corresponding point candidates are determined to be present, and calculates disparity data for the target image data.

CITATION LIST

Patent Literature

PTL 1
Japanese Patent Application Laid-Open No. 2001-351200
PTL 2
Japanese Patent Application Laid-Open No. 2007-85773

SUMMARY OF INVENTION

Technical Problem

However, with a conventional configuration it is difficult to measure a true distance since the position of a corresponding point is decided according to the control mode. For example, in a case in which the interval between consecutive similar patterns included in an object present at a position at a distance of 5.7 m from a vehicle in question is actually 10 cm, if the distance (base length) between the two lenses of a stereo camera is assumed to be 0.12 m and the focal length of the camera is assumed to be 1000 pixels, in order to become minimal at a similar pattern position within a search area, a plurality of corresponding point candidates for which disparity is 5, 21, and 37 are calculated. In such a case, based on the principle of triangulation, the relationship (disparity)=(base length)×(focal length)/(distance) holds true, and therefore a corresponding point candidate for which disparity is 0.12×1000/5.7=21 is a true corresponding point.

However, when the nearest corresponding point candidate is selected, a corresponding point candidate for which disparity is 37 is selected, and therefore distance is erroneously calculated as 0.12×1000/37=3.2 m, whereas when the most distant corresponding point candidate is selected, a corresponding point candidate for which disparity is 5 is selected, and therefore distance is erroneously calculated as 0.12×1000/5=24 m.

Consequently, if bar-shaped objects are arranged at 10 cm intervals, as in the case of a railing, and these are recognized as objects with consecutive similar image patterns, there is a possibility of brake control not operating adequately even if the control mode is pre-crash control. Also, there is a possibility of deceleration not being performed adequately when the control mode is inter-vehicle distance control, and there is a possibility of the vehicle not being parked in a suitable place when the control mode is parking assist control.

A further problem has been that, when an object is present that includes consecutive similar patterns, as in the case of a railing, determination of the vehicle's course may be inadequate because detection of a railing is difficult.

It is an object of the present invention to provide a disparity calculation method and apparatus that calculate true disparity even when there is an object that includes consecutive similar patterns.

Solution to Problem

A disparity calculation apparatus according to one aspect of the present invention is provided with: a stereo image data acquisition section that has a first imaging system and a second imaging system, and acquires an object with data of a target image captured using the first imaging system, and an object with data of a reference image captured using the second imaging system; a stereo matching section that calculates an evaluation value distribution indicating a degree of difference of image brightness between a target point that the target image has and a plurality of search points that the reference image has; a corresponding point candidate number determination section that detects a search point for which an evaluation value is minimal from search points included in the evaluation value distribution, and if the quantity of detected search points is a plurality, outputs the detected plurality of search points as corresponding point candidates; a minimal value distribution calculation section that calculates, from the evaluation value distribution in which the corresponding point candidates are included, a first minimal value distribution corresponding to a first target point that is a minimal value distribution indicating a coordinate distribution of the corresponding point candidates, and a second minimal value distribution corresponding to one or a plurality of second target points present in a peripheral area of the target image including the first target point; an evaluation value map calculation section that calculates an evaluation value map indicating a coordinate variation relationship between the first target point and the second target point, and the plurality of corresponding point candidates, based on the first minimal value distribution and the second minimal value distribution; a corresponding point determination section that determines a corresponding point candidate for which the coordinate variation is smallest in the evaluation value map to be a corresponding point; and a disparity data output section that outputs a disparity value that is a difference between a coordinate point of the corresponding point in the reference image and a coordinate point of the first target point in the reference image.

By this means, by superimposing, in a target image, information of another target point present in the peripheral area of a target point, there is an effect of enabling true disparity to be calculated even in the case of an object that includes consecutive similar patterns.

Also, according to a disparity calculation apparatus according to one aspect of the present invention, the range of a peripheral area is set based on a number and interval of search points for which an evaluation value included in a first target point minimal value distribution is minimal.

By this means, there is an effect of enabling the size of each object to be calculated with a higher degree of precision even in a case in which there are a plurality of objects that include consecutive similar patterns, and the distances of the objects differ.

Also, according to a disparity calculation apparatus according to one aspect of the present invention, when the quantity of corresponding point candidates relating to a first target point and the quantity of corresponding point candidates relating to a second target point differ, a corresponding point determination section excludes a corresponding point candidate included only in either of minimal value distributions relating to the first target point and second target point in determining a corresponding point.

By this means, there is an effect of enabling the information processing load on the disparity calculation apparatus to be reduced, and true disparity to be calculated.

Also, according to a disparity calculation apparatus according to one aspect of the present invention, a corresponding point determination section extracts a corresponding point candidate for which the coordinate variation is smallest as a corresponding point by performing a Hough transform on an evaluation value map.

By this means, there is an effect of enabling distance to be calculated with a higher degree of precision even in a case in which an object that include consecutive similar patterns is linear in shape.

Also, according to a disparity calculation apparatus according to one aspect of the present invention, a first imaging system has a first lens; a second imaging system has a second lens; and, in a case in which a peripheral area is an area having an arbitrary width in the direction of arrangement of the first lens and the second lens, an evaluation value map calculation section calculates an evaluation value map based on a first evaluation value distribution, a second evaluation value distribution, and a minimal value distribution corresponding to a third target point present in a direction perpendicular to the direction of arrangement of the first lens and the second lens.

By this means, there is an effect of corresponding point extraction accuracy being improved by calculating an evaluation value map based on a minimal value distribution relating to each target point present in a peripheral area after superimposing a minimal value distribution of another target point present in a direction perpendicular to the direction of arrangement of the first lens and second lens.

Also, a disparity calculation apparatus according to one aspect of the present invention sets the range of a peripheral area based on a sum of differences of degrees of difference of image brightness corresponding to a plurality of search points between an evaluation value distribution corresponding to a first target point and an evaluation value distribution corresponding to a second target point.

By this means, there is an effect of the probability of estimating a true disparity value being increased by including a target point for which disparity (distance) is the same in a peripheral area.

A disparity calculation method according to one aspect of the present invention acquires an object with data of a target image captured using a first imaging system, and an object with data of a reference image captured using a second imaging system; calculates an evaluation value distribution indicating a degree of difference of image brightness between a target point that the target image has and a plurality of search points that the reference image has; detects a search point for which an evaluation value is minimal from search points included in the evaluation value distribution, and if the quantity of detected search points is a plurality, outputs the detected plurality of search points as corresponding point candidates; calculates, when the corresponding point candidates are included in the evaluation value distribution, a first minimal value distribution corresponding to a first target point that is a minimal value distribution indicating a coordinate distribution of the corresponding point candidates, and a second minimal value distribution corresponding to one or a plurality of second target points present in a peripheral area of the target image including the first target point; calculates an evaluation value map indicating a coordinate variation relationship between the first target point and the second target point, and the plurality of corresponding point candidates, based on the first minimal value distribution and the second minimal value distribution; determines a corresponding point candidate for which the coordinate variation is smallest in the evaluation value map to be a corresponding point; and outputs a disparity value that is a difference between a coordinate point of the corresponding point in the reference image and a coordinate point of the first target point in the reference image.

By this means, by superimposing, in a target image, information of another target point present in a peripheral area of a target point, there is an effect of enabling true disparity to be calculated even in the case of an object that includes consecutive similar patterns.

Advantageous Effects of Invention

According to the present invention, by determining a corresponding point by adding comparative information of a peripheral area, rather than a corresponding search point in a small-area comparison, in stereo matching, true disparity can be calculated for an object that includes consecutive similar patterns, which is difficult in stereo matching, and the distance of a guardrail such as often found in a traffic environment, a railing such as often found in parking lots and the like, and so forth, can be stably measured, enabling vehicle control, warnings, and so forth also to operate correctly.

BRIEF DESCRIPTION OF DRAWINGS

FIGS. 8A-D comprise schematic diagrams showing a procedure for calculating an evaluation value map;

FIGS. 9A-D comprise schematic diagrams showing the minimal value distribution relationship in a case in which the number of minimal values in Hm(xbn) and the number of minimal values in Hm(xb1) differ;

FIGS. 10A-C comprise schematic diagrams showing an example of a railing object shown in a target image and an obtained evaluation value map;

FIGS. 11A-D comprise schematic diagrams showing evaluation value distribution superposition in Embodiment 2 of the present invention.

DESCRIPTION OF EMBODIMENTS

Now, embodiments of the present invention will be described in detail with reference to the accompanying drawings.

Embodiment 1

Figure 1:
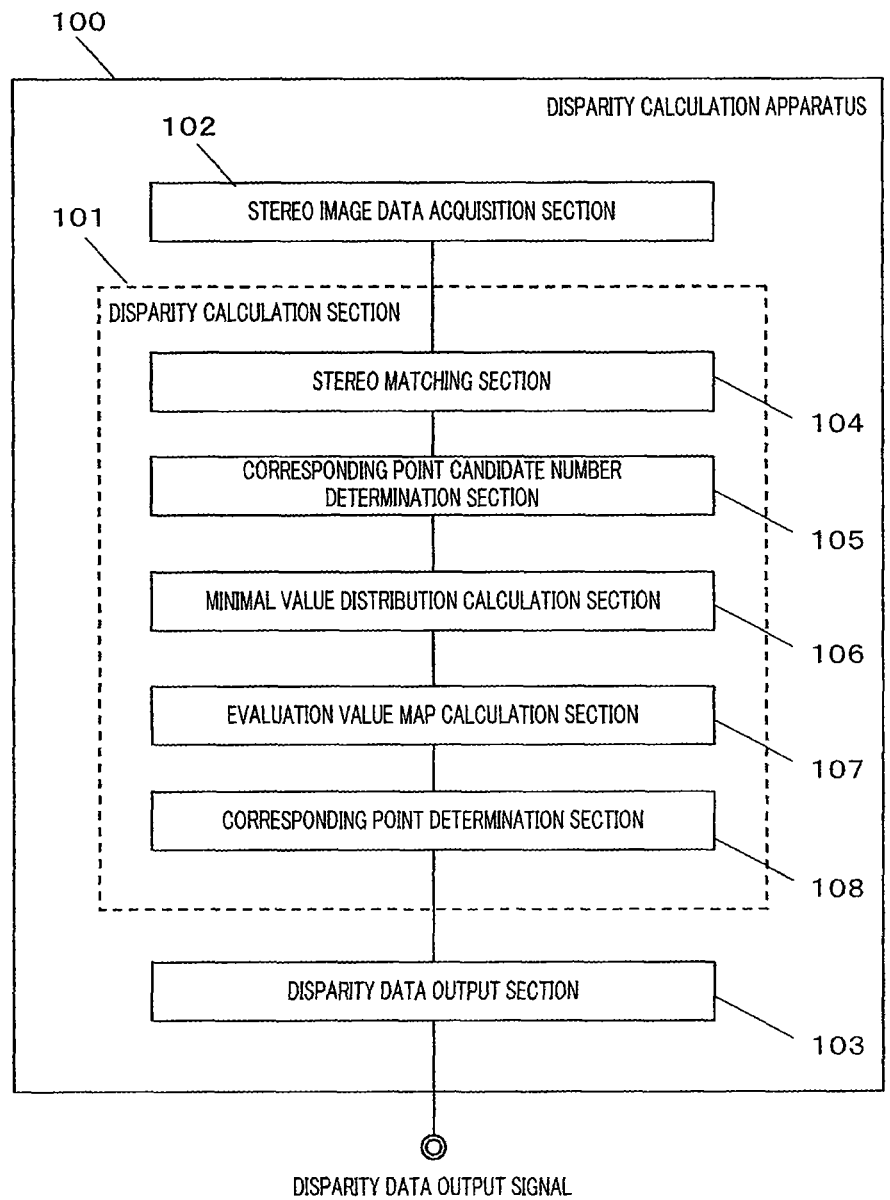
FIG. 1 is a drawing showing a block configuration of a disparity calculation apparatus in Embodiment 1 of the present invention.

FIG. 1 is a block diagram of disparity calculation apparatus 100 in Embodiment 1 of the present invention. Disparity calculation apparatus 100 shown in FIG. 1 has a configuration that includes disparity calculation section 101, stereo image data acquisition section 102, and disparity data output section 103.

Disparity calculation section 101 shown in FIG. 1 has a configuration that includes stereo matching section 104, corresponding point candidate number determination section 105, minimal value distribution calculation section 106, evaluation value map calculation section 107, and corresponding point determination section 108.

In disparity calculation apparatus 100, disparity calculation section 101 performs disparity calculation based on stereo images acquired by stereo image data acquisition section 102, and disparity data output section 103 outputs disparity data.

Figure 2:
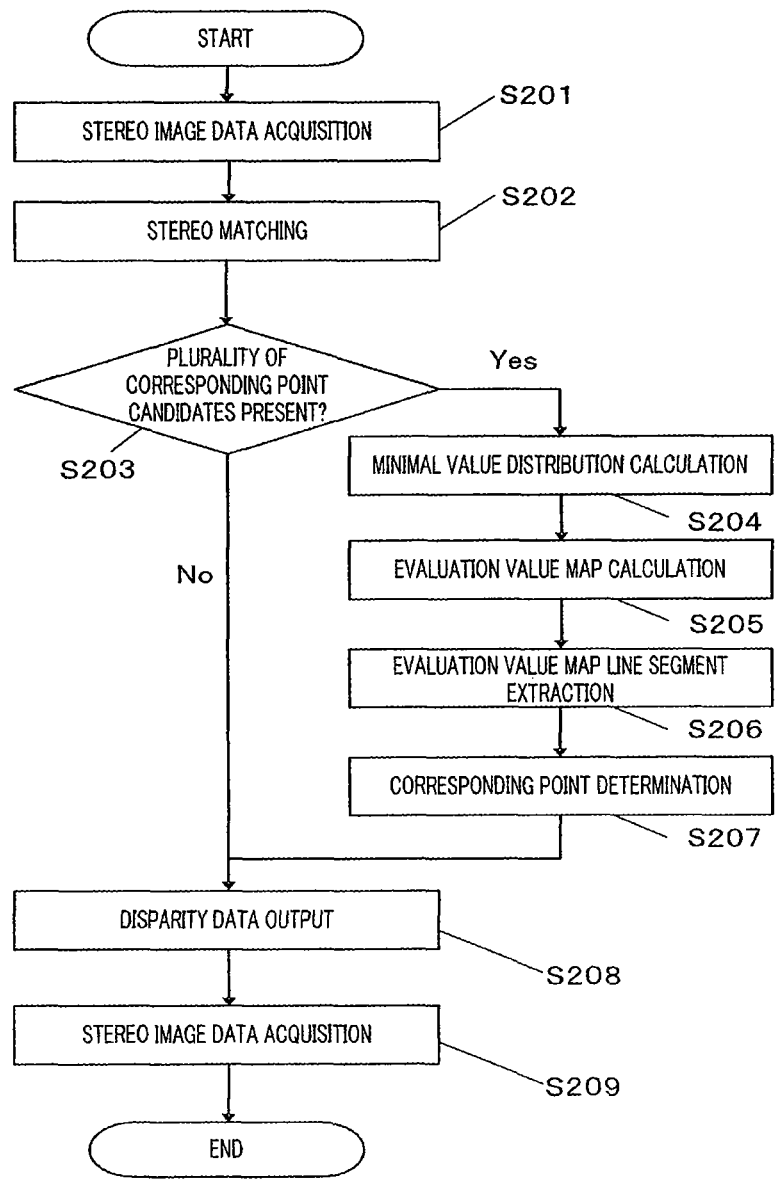
FIG. 2 is a drawing showing the processing flow of a disparity calculation method.

FIG. 2 is a processing flowchart of the disparity calculation method of disparity calculation apparatus 100 shown in FIG. 1. A description will now be given of the disparity calculation method and disparity calculation apparatus in Embodiment 1 of the present invention.

Stereo image data acquisition section 102 acquires a pair of stereo image data captured simultaneously by a stereo camera incorporating two lenses aligned horizontally (S201). The stereo image data includes target image data that is data of a target image captured by one lens, and reference image data that is data of a reference image captured by the other lens. The stereo camera has been described as being a camera having two lenses aligned horizontally, but this is not a limitation, and this configuration may be replaced by two cameras.

Figures 3A, 3B:
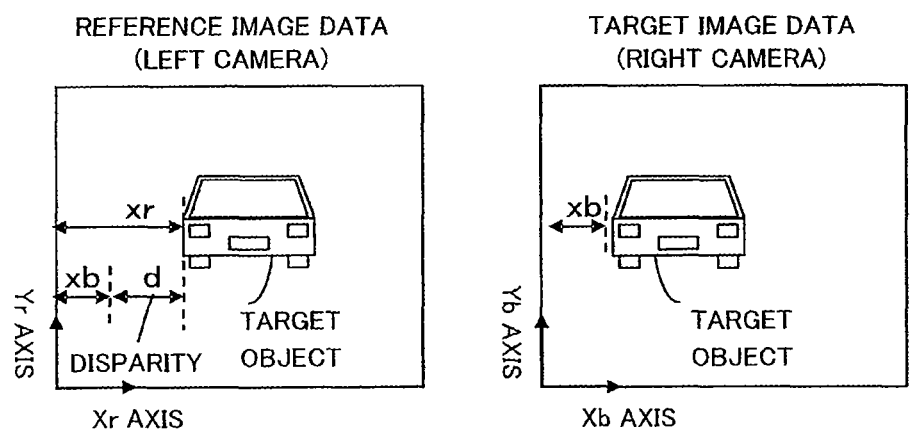
FIGS. 3A and B are drawings showing positions of an object in stereo images.

FIG. 3 is a drawing showing stereo images in a case in which a target object is a vehicle ahead, with FIG. 3A showing a target image, and FIG. 3B showing a reference image. Either of the two lenses can be used to capture an image that is taken as a target image, but in the following description an image captured with the right lens, looking toward the target object, is assumed to be a target image, and an image captured with the left lens is assumed to be a reference image.

The position of a target object captured in a reference image is a position displaced to the right as compared with the position of the target object captured in a target image. This displacement is disparity, and changes according to the distance of an object that is ranged. Specifically, if coordinates on the left side of a target object in a target image are designated xb, and coordinates on the left side of the target object in a reference image are designated xc, disparity d of the left side of the target object is xr−xb, the difference between the coordinate positions.

Acquired stereo image data undergoes lens distortion compensation and optical axis rectification, and is converted to rectificated stereo image data. Lens distortion compensation can be implemented by means of various methods, such as performing distortion compensation using a compensation conversion table that uses a lens design value, performing compensation by means of parameter estimation using a radial distortion model, and so forth, and is not a limitation on the present invention.

Optical axis rectification can be implemented by means of various methods for performing stereo camera optical axis rectification, and is not a limitation on the present invention. For example, rectification can also be implemented using a method whereby a grid pattern is set up in a common field of view of a stereo camera, a relative relationship of the stereo camera is calculated from an associated grid point position, and optical axis rectification is performed.

In disparity calculation section 101, stereo matching is performed by stereo matching section 104 between a target image and a reference image acquired by stereo image data acquisition section 102 (S202).

Stereo matching section 104 calculates an evaluation value distribution indicating a degree of difference of image brightness between each target point included in an arbitrary range of each target image, and a search point included in a search area that includes a coordinate point corresponding to a target point of a target image in a reference image. Here, a search area is an area having an arbitrary range.

A calculated evaluation value distribution for each target point is recorded in memory incorporated in stereo matching section 104.

Corresponding point candidate number determination section 105 determines whether or not there are a plurality of corresponding point candidates for which an evaluation value is minimal in the evaluation value distribution of each target point (S203).

For a target point for which there is determined to be only one corresponding point candidate among the target points in a target image, disparity data output section 103 records a difference between the corresponding point candidate position and a coordinate point positioned at a coordinate point identical to that target point in a reference image as a disparity value of that target image. Then disparity data output section 103 outputs disparity data (S208).

On the other hand, for a target point for which there are determined to be a plurality of corresponding point candidates among the target points in a target image, minimal value distribution calculation section 106 calculates a corresponding point candidate for which an evaluation value is minimal in the evaluation value distribution, and calculates a minimal value distribution (S204).

Evaluation value map calculation section 107 calculates an evaluation value map (S205). An evaluation value map is a map indicating variation for each corresponding point candidate of a disparity value of each corresponding point candidate corresponding to each target point, based on a minimal value distribution of a target point for which there are determined to be a plurality of corresponding point candidates, and a minimal value distribution of another target point positioned in a peripheral area that includes that target point in a reference image.

Corresponding point determination section 108 extracts a line segment that continues in the most linear form in the evaluation value map (S206), and determines a coordinate point of an extracted corresponding point candidate to be a corresponding point (S207).

The functions and effects of the configuration elements of disparity calculation section 101 will now be described in detail.

Stereo matching section 104 performs stereo matching between a target image and a reference image. That is to say, stereo matching section 104 calculates an evaluation value distribution indicating a degree of difference of image brightness between each target point included in an arbitrary range of a target image, and each search point in a search area that includes a coordinate point identical to each target point (S202).

Here, the range of a search area is arbitrary, and the range of the distance of a measured object is decided according to geometric parameters including the base length of the stereo camera and the focal length of the camera.

Figure 4B:
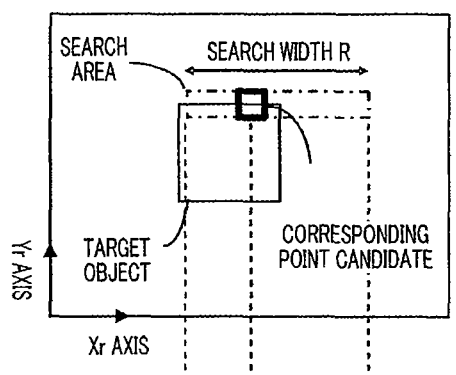
FIGS. 4A-C are drawings provided to explain an evaluation value distribution for each target point in an arbitrary range of a target image.
Figure 4A:
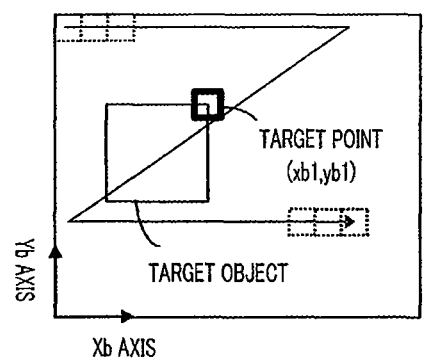
Figure 4C:
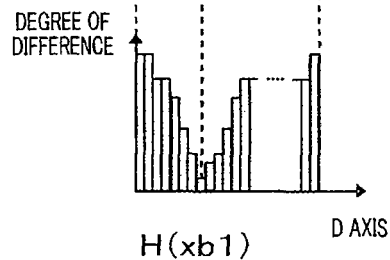

In FIG. 4, with regard to target points in an arbitrary range of a target image, FIG. 4A shows a target image when calculating an evaluation value distribution, FIG. 4B shows a reference image, and FIG. 4C shows an evaluation value distribution. The procedure for calculating an evaluation value distribution for a target point will now be described.

In this description, an arbitrary range of a target image is described as a partial range as shown in the drawing, but may also be a total range. Also, coordinates of a target point for which an evaluation value distribution is calculated are assumed to be (xb1,yb1), and stereo image data is assumed to have undergone rectification. When stereo image data has undergone rectification, a Y coordinate of an object in a target image and a Y coordinate of an object in a reference image become the same.

In FIG. 4, an area indicated by a square is one pixel, and one pixel is a target point. The same also applies in subsequent drawing descriptions.

As a search point corresponding to target point (xb1,yb1) in a target image, stereo matching section 104 sets a fixed range (search width) in the X coordinate direction from a coordinate point positioned at coordinates (xr1=xb1, yr1=yb1) identical to coordinate point (xb1,yb1) in a reference image as the search range shown in FIG. 4B.

The search range is an area having a fixed width on the Yr axis—that is, in the horizontal direction. The reason for setting the search area in the horizontal direction of the reference image is that the lenses of a stereo camera are aligned in the horizontal direction.

Specifically, for (xb1,yb1) that are coordinates of a target point in the target image, when a search width set based on a minimum value/maximum value of the distance of a target object necessary for an application is designated R, the search point range in the reference image is (xr1,yr1), (xr1+1,yr1), (xr1+2,yr1), . . . , (xr1+R,yr1). Coordinates (xb1,yb1) in the target image and coordinates (xr1,yr1) in the reference image represent the same coordinate position in an image.

Then a degree of difference of image brightness between each search point within the search range and target point xb1 is calculated, and evaluation value distribution H(xb1) is calculated according to the degrees of difference.

Here, the relationship between the D axis (Depth axis) of evaluation value distribution H(xb1), and the Xb axis and Xr axis, is that the D axis represents displacement of the origin of the Xr axis to the xb1 position, and the dimensions of the D axis, Xb axis, and Xr axis are all pixels.

In the above description, stereo image data has been described as having undergone rectification, but if stereo image data has not undergone rectification, vertical alignment of stereo images has not been performed, and therefore a point of a target object influenced by target image target point (xb1,yb1) is not influenced by a Y coordinate identical to a Y coordinate of coordinates of that target point in the reference image, and therefore is set as a search area, including target point Y axis direction alignment.

Evaluation value distribution H(xb1) obtained by stereo matching is a one-dimensional distribution in which the horizontal axis is the D axis, and the vertical axis indicates a degree of difference of image brightness between a target point and a corresponding search point. For the degree of difference of image brightness between a target point and a search point, a sum of absolute differences (SAD) of image brightness of an 8×8 small area centered on a target point and an 8×8 small area centered on each search point is used.

It is possible for the degree of difference of image brightness used as an evaluation value to be replaced by any kind of degree of difference whereby a value is smallest in the case of a total match, such as sum of squared differences (SSD) or the like. Also, for the degree of difference of image brightness used as an evaluation value, it is also possible to use normalized cross correlation (NCC) or the like, with an indicator of a degree of similarity for which a value is greatest in the case of a total match undergoing positive/negative reversal.

The above-described processing is performed for each target point, and a calculated evaluation value distribution for each target point is stored in memory incorporated in stereo matching section 104.

Corresponding point candidate number determination section 105 searches for a minimal value in evaluation value distribution H(xb1).

If the result of the search for a minimal value by corresponding point candidate number determination section 105 is that there is one minimal value, the search point for which the evaluation value is minimal is determined to be a corresponding point (S203: No), the corresponding point candidate position is recorded as the disparity value of that target point, and disparity data is output (S208).

Figure 5B:
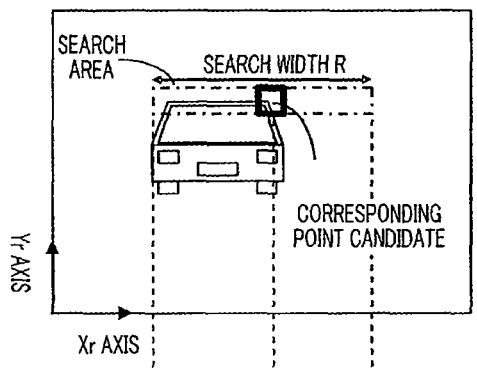
FIGS. 5A-C are drawings provided to explain an evaluation value distribution for each target point in an arbitrary range of a target image.
Figure 5A:
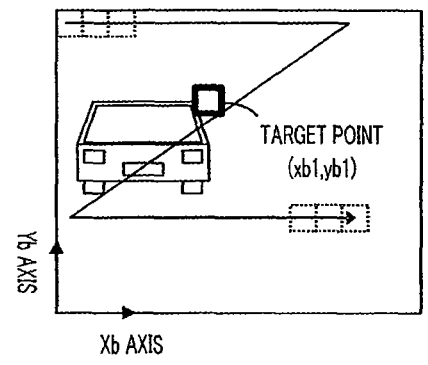
Figure 5C:
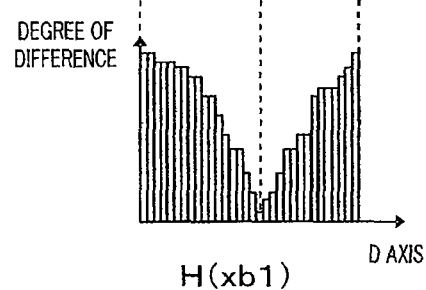

FIG. 5 shows a case in which a target object is a vehicle positioned ahead, with FIG. 5A showing a target image, FIG. 5B showing a reference image, and FIG. 4C showing an evaluation value distribution. In the case of an object that does not include consecutive similar patterns, such as a vehicle, there is only one corresponding point candidate in the reference image for which image brightness is of the same level as a small area that includes target point (xb1,yb1), as shown in FIG. 5C.

On the other hand, if a plurality of minimal values are detected in an evaluation value distribution as a result of a search for a minimal value by corresponding point candidate number determination section 105, the plurality of search points for which the evaluation value is minimal are determined to be a plurality of corresponding point candidates (S203: Yes).

Figure 6A:
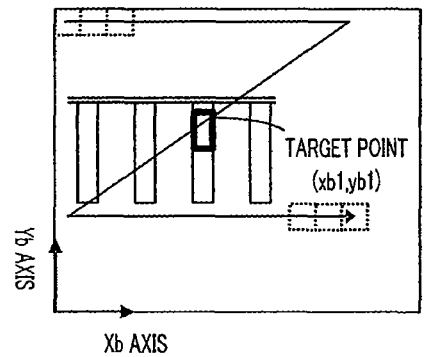
FIGS. 6A-D are drawings provided to explain an evaluation value distribution for each target point in an arbitrary range of a target image.
Figure 6B:
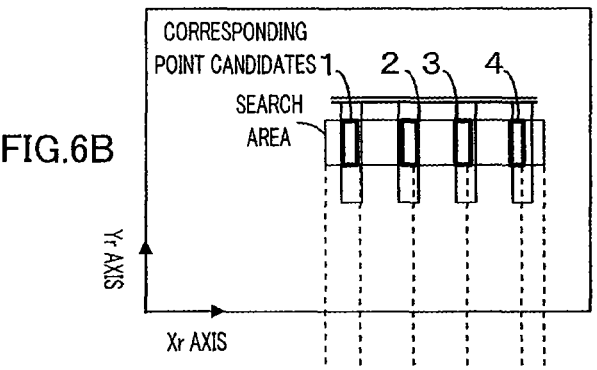
Figure 6C:
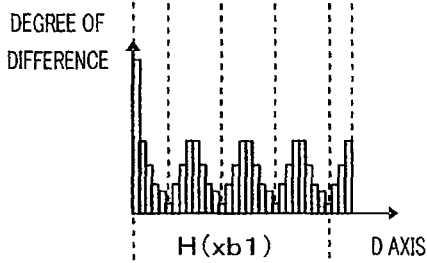
Figure 6D:
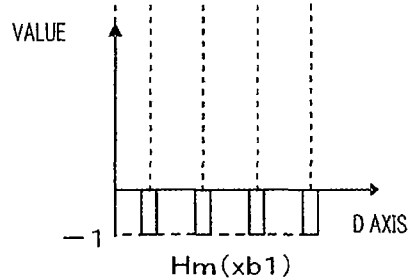

FIG. 6 shows a case in which a target object is a railing positioned ahead, with FIG. 6A showing a target image, FIG. 6B showing a reference image, FIG. 6C showing an evaluation value distribution, and FIG. 6D showing minimal value distribution Hm(xb1) described later herein. In the case of an object that includes consecutive similar patterns, such as a railing, there are a plurality of corresponding point candidates in the reference image for which image brightness is of the same level as target point (xb1,yb1) in the target image, as shown in FIG. 6C.

Determination of whether or not there are a plurality of corresponding point candidates can also be implemented by means of another method whereby whether or not a distribution is periodic is determined from a one-dimensional distribution, such as calculating a minimal value of an evaluation value distribution, and making a determination according to whether there are several minimal values.

If a plurality of minimal values are detected in an evaluation value distribution as a result of a search for a minimal value by corresponding point candidate number determination section 105, minimal value distribution calculation section 106 extracts the coordinates of corresponding point candidates for which the evaluation value is minimal, and calculates minimal value distribution Hm(xb1) showing only the distribution of minimal values (S204).

The procedure for calculating minimal value distribution Hm(xb1) will now be described using FIG. 6.

Since the target object is a railing that includes consecutive similar patterns as shown in FIG. 6A, evaluation value distribution H(xb1) is a distribution having a minimal value at a plurality of positions as shown in FIG. 6C.

Minimal value distribution calculation section 106 calculates a distribution resulting from extracting only the plurality of minimal value positions in evaluation value distribution H(xb1), and calculates minimal value distribution Hm(xb1) by assigning a value of −1 to a minimal value position in the calculated evaluation value distribution, and a value of 0 to other positions.

Here, a minimal value position in minimal value distribution Hm(xb1) shown in FIG. 6D indicates a position of a corresponding point candidate in the reference image, with the left side of the search area for target point (xb1,yb1) as the origin.

The constant of a minimal value position used when calculating a minimal value distribution, and the value of a constant of other positions, are only examples, and are not limitations on the present invention.

With regard to an evaluation value distribution for a target point, when determination of whether or not there are a plurality of corresponding point candidates is performed and there are a plurality of corresponding point candidates, the series of procedures for calculating a minimal value distribution are executed for all target points stored in memory.

When determining a plurality of search points for which the evaluation value is minimal to be corresponding point candidates, provision may also be made for a predetermined threshold value to be provided on the evaluation value axis, and for a search point for which the predetermined threshold value is not exceeded to be taken as a corresponding point candidate. By this means, a search point that is a search point with a high degree of difference and that is a minimal point can be excluded from corresponding point candidates, and the accuracy of corresponding point candidate determination can be improved.

FIG. 7 comprises schematic diagrams showing the relationship between minimal value distribution Hm(xb1) of target point (xb1,yb1) for which there are a plurality of corresponding point candidates, and minimal value distribution Hm(xb2) of another target point (xb2,yb2) adjacent to target point (xb1,yb1). FIG. 7A shows a target image, FIG. 7B shows a reference image, FIG. 7C shows minimal value distribution Hm(xb1) of target point (xb1,yb1), FIG. 7D shows minimal value distribution Hm(xb2) of target point (xb2, yb2), and FIG. 7E shows corresponding point candidates for target point (xb1,yb1) and corresponding point candidates for target point (xb2,yb2) in the reference image shown in FIG. 7B.

Figure 7A:
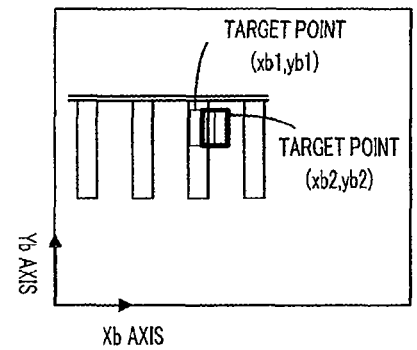
FIGS. 7A-E comprise schematic diagrams showing the relationship between minimal value distribution Hm of a target point for which there are a plurality of corresponding point candidates, and minimal value distribution Hm of another target point adjacent to the target point in a target image.
Figure 7B:
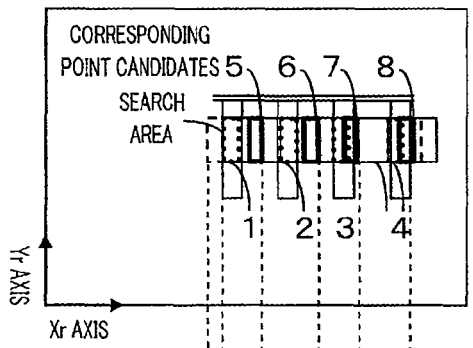

The relationship of minimal value distributions of target point (xb1,yb1) and adjacent target point (xb2,yb2) will now be described. The description assumes that corresponding point candidates of target point (xb1,yb1) shown in FIG. 7A and FIG. 7E are corresponding point candidate 1 through corresponding point candidate 4 shown in FIG. 7B, and corresponding point candidates of target point (xb2,yb2) shown in FIG. 7A and FIG. 7E are corresponding point candidate 5 through corresponding point candidate 8 shown in FIG. 7B. Corresponding point candidate 1 through corresponding point candidate 4 are indicated by dotted lines.

In the target image shown in FIG. 7A, target point (xb2,yb2) is selected as a target point adjacent to target point (xb1,yb1). The search area for target point (xb2,yb2) shown in FIG. 7B is an area shifted by the difference between xb2 and xb1 on the Xr axis relative to the search area for target point (xb1,yb1).

Figure 7C:
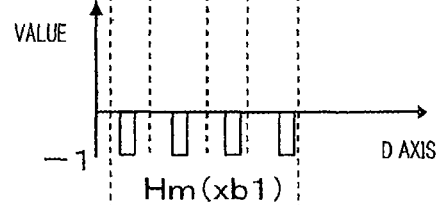
Figure 7D:
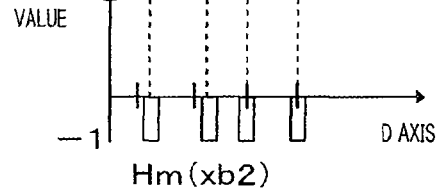
Figure 7E:
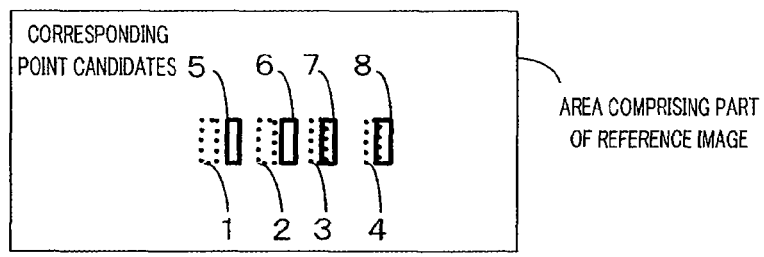

Here, when the positions of the minimal values on the D axis of minimal value distribution Hm(xb1) of target point (xb1,yb1) shown in FIG. 7C are compared with the positions of the minimal values on the D axis of minimal value distribution Hm(xb2) of target point (xb2,yb2), there is a minimal value for which the D axis is shifted by the difference between xb2 and xb1, and there are also minimal values for which the shift is greater than the difference between xb2 and xb1 or less than the difference between xb2 and xb1.

To give an explanation using FIG. 7E, since corresponding point candidate 7 for target point (xb2,yb2) is present at a position shifted by the difference between xb2 and xb1 on the Xr axis from the coordinates of corresponding point candidate 3 for target point (xb1,yb1), and the distance of a point captured at an adjacent target point can be considered to be approximately equal, this means that there is a high probability of each corresponding point candidate being a true corresponding point.

On the other hand, since corresponding point candidate 5 for target point (xb2,yb2) is not present at a position shifted by the difference between xb2 and xb1 on the Xr axis from the coordinates of corresponding point candidate 1 for target point (xb1,yb1) in FIG. 7E, this means that a corresponding point candidate is not a true corresponding point. In such a case, the areas of corresponding point candidate 3 and corresponding point candidate 7 are true corresponding point positions and have true disparity, while the areas of corresponding point candidate 1 and corresponding point candidate 5 are not true corresponding point positions.

Evaluation value map calculation section 107 calculates an evaluation value map based on minimal value distributions of target point (xb1,yb1) for which a minimal value distribution was calculated by minimal value distribution calculation section 106, and a position present in a peripheral area of that target point xb1, or a plurality of other target points xbn (where n is a natural number), in the target image (S205).

Here, a peripheral area is an area that includes target point (xb1,yb1), and has an arbitrary width in the Yb axis direction, in the target image. In principle, each target point incorporated in the peripheral area is an area for which the Yb coordinate is the same. The reason for setting the peripheral area in the horizontal direction in the target image is that setting a search area in the horizontal direction of the reference image for each target point gives rise to a probability of erroneously detecting a similar pattern in the horizontal direction.

The reason for setting the search area in the horizontal direction of the reference image is that the stereo camera is aligned in the horizontal direction, and if the stereo camera is aligned in the vertical direction, the search area is in the vertical direction of the reference image, and the peripheral area in the reference image is in the vertical direction.

FIG. 8 comprises schematic diagrams showing a procedure for calculating an evaluation value map based on minimal value distribution Hm(xb1) of target point (xb1,yb1) and minimal value distribution Hm(xbn) of target points (xbn,ybn) (where n is a natural number) positioned in a peripheral area of target point (xb1,yb1). FIG. 8A shows a target image, FIG. 8B shows a reference image, FIG. 8C shows the relationship of minimal value distributions Hm(xbn) of target points (xbn,ybn), and FIG. 8D shows an evaluation value map calculated by superimposing minimal value distributions of target points (xbn,ybn). The method of calculating the evaluation value map shown in FIG. 8 will now be described.

Minimal value distributions Hm(xbn) calculated for each of other target points (xb2,yb2), (xb3,yb3), and (xb4,yb4) present in the peripheral area of target point (xb1,yb1) in the target image shown in FIG. 8A are read from memory. Here, the description assumes that there are four corresponding point candidates of each target point, but this is not a limitation on the present invention.

As shown in FIG. 8C, among the four corresponding point candidates distributed in each minimal value distribution Hm(xbn) (where n is an integer from 1 to 4), there are corresponding point candidates whose distance from the origin differs for each minimal value distribution. In FIG. 8C, the distances from the origin of corresponding point candidates on lines a, b, and d differ for each minimal value distribution. This means that disparity values for each target point vary.

Evaluation value map M(D,Xb) aligns the D axes of each minimal value distribution Hm(xbn) (where n is an integer from 1 to 4) shown in FIG. 8C, and shows the variation of each corresponding point candidate on the D axis relative to the Xb axis—that is, the variation of the disparity value—in a line relative to the Xb axis. Information processing is assumed to be processing that increases the Xb axis dimension, and processes corresponding point candidate positions as a three-dimensional distribution.

That is to say, evaluation value map M(D,Xb) shows the coordinate variation relationship between each target point and a plurality of corresponding point candidates, based on each minimal value distribution shown in FIG. 8C.

In evaluation value map M(D,Xb), corresponding point candidates on line c show no variation in the disparity value of each corresponding point candidate relative to each target point—that is, each target point is in the same disparity, which is to say, at the same distance—indicating a true disparity value.

Here, if xb1 denotes the X coordinate of a target point, and xb2, xbn denote the X coordinates of target points that are adjacent to the target point in a horizontal direction, the equation for calculating evaluation value map M(D,Xb) is as shown in equation 1 below.

[1]

$$M(D,Xb) = \{Xm(xb_1), Hm(xb_2), Hm(xb_3), \ldots, Hm(xb_N)\} \quad \text{(Equation 1)}$$

In the above description, an arbitrary area extending across the image at Y coordinate (yb1) is set as a peripheral area of target point (xb1,yb1), but all target points on the Xb axis of Y coordinate (yb1) in the target image may also be included.

In the peripheral area setting method, for example, a range up to a peripheral target point in which a difference between a feature quantity of an evaluation value distribution of a target point—that is, a number of minimal values or an interval between minimal values—and a feature quantity of an evaluation value distribution of another target point present in a peripheral area becomes a certain range can be made a selection range. By limiting the selection range, true disparity of each object can be calculated when there are a plurality of objects that include consecutive similar patterns, and these are objects whose mutual positions are not consecutive.

Corresponding point determination section 108 calculates a corresponding point candidate whose line has the strongest linearity among lines a through d shown in evaluation value map M(D,Xb)—that is, whose disparity value coordinate variation is smallest among the corresponding point candidates—as a corresponding point. In evaluation value map M(D,Xb) shown in FIG. 8D, of lines a through d, line c is a straight line with the strongest linear component.

Specifically, in order to extract objects that are present consecutively in a straight line, such as rails of a railing, a line with the strongest linear component such that points with a small evaluation value are consecutive in a straight line is extracted by means of a Hough transform in evaluation value map M(D,Xb) (S206). A Hough transform is a basic kind of image processing that extracts a straight-line component in an image. Here, a line with the strongest linear component is extracted as a result of performing a Hough transform for an entire evaluation value map.

In a physical sense, if an object that includes consecutive similar patterns is aligned linearly in real space, a result of distribution in a line with the strongest linearity is obtained for a corresponding point in an evaluation value map.

A point with a small evaluation value in an evaluation value map is a point denoting a position at which an object is present (an "object presence position"), and in the case of an object that includes consecutive similar patterns, such as a railing, rails (supporting posts) at the same position cannot necessarily be mutually associated between a target image and a reference image, and therefore a plurality of object presence position candidates occur.

When there are a plurality of corresponding point candidates, a plurality of lines are obtained in an evaluation value map, but in the case of a straight line that is not a true disparity position, there is a part in which linearity is partially disrupted, and places occur that are not linearly distributed.

Such a part is a part comprising a rail of a railing of slightly different thickness in real space, or a light-colored part in the case of a crosswalk marking. That is to say, an object that includes consecutive similar patterns, such as a railing, actually has disruptions in periodicity, and a position of a corresponding point candidate for which there are a plurality of such parts and a position of a corresponding point candidate for which there are a plurality of parts in which periodicity is not disrupted are different. Consequently, in the case of an object that includes consecutive similar patterns, such as a railing, if the positions of a plurality of corresponding point candidates are compared for a part with and a part without disruption of periodicity, there are corresponding points that match only at true disparity, and there is no match at other than true disparity.

In a representation as an evaluation value map, the result obtained is that linearity is maintained only at a true disparity position, and linearity is disrupted at other disparity positions.

Here, if, for target point position (xb1,yb1)—that is, a position at which xb=xb1—in FIG. 8A, a true corresponding point position to be found is designated Dcorrect(xb1), a minimal evaluation value position is designated DM(xb1), and a calculated straight line position is designated Dline (xb1), a true corresponding point can be represented by equation 2 below. Calculated straight line position Dline(xb1) represents a D axis value for which xb=xb1 for line c in FIG. 8D.

[2]

$$D_{Correct}(xb1) = \underset{D_M}{\mathrm{argmin}}(|D_M(xb1) - D_{line}(xb1)|) \quad \text{(Equation 2)}$$

The processing represented by equation 2 is executed for each target point position. This processing is necessary to prevent the influence of error when line c in FIG. 8D is estimated because error when estimating line c is superimposed if the position of line c is taken directly as the true disparity of xb=xb1.

In the above description, a case has been described in which the number of minimal values in minimal value distribution Hm(xbn) of another target point (xbn,ybn) positioned in a peripheral area of target point (xb1,yb1) and the number of minimal values in minimal value distribution Hm(xb1) of target point (xb1,yb1) are the same. A case in which the numbers of minimal values are different will now be described. A possible case of this kind is when a corner of an object that includes consecutive similar patterns, such as a railing, is taken as a target object.

FIG. 9 comprises schematic diagrams showing the minimal value distribution relationship in a case in which the number of minimal values in Hm(xbn) and the number of minimal values in Hm(xb1) differ. FIG. 9A shows a target image, FIG. 9B shows a reference image, FIG. 9C shows the relationship of minimal value distributions of target points (xbn,ybn), and FIG. 9D shows an evaluation value map calculated by integrating minimal value distributions of target points (xbn,ybn).

In FIG. 9A, target point (xb1,yb1) is positioned at the rightmost end of a railing shown in a target image. Consequently, in a case in which a search area is limited to a certain width, there may be a search area that includes three rails while there is also a search area that includes two rails, as shown in FIG. 9B.

In such a case, as shown in FIG. 9C, the numbers of minimal values included in respective minimal value distributions Hm(xbn) for target point (xb1,yb1) and another target point positioned in a peripheral area differ. Consequently, a part in which a line segment is missing occurs in straight line a, as shown in FIG. 9D.

The method of extracting a corresponding point from the evaluation value map shown in FIG. 9D may be a method of the same kind as described with regard to FIG. 8.

Also, the method of extracting a corresponding point from the evaluation value map shown in FIG. 9D can be a method of a different kind from that described with regard to FIG. 8, and corresponding point determination section 108 can execute information processing that eliminates a line in which part of a line segment is missing from corresponding point candidates. By this means, disparity calculation apparatus 100 can reduce the processing load required to extract a line having the strongest linearity from the evaluation value map.

With regard to FIG. 9D, line a in which part of a line segment is missing has been described as not being a straight line, but information processing for elimination from corresponding point candidates can also be executed in a similar way even if a line in which part of a line segment is missing is a straight line.

In the above description, a case has been described in which the direction in which the rails of a railing are consecutive is perpendicular to the optical axis of a lens, but a true disparity value can also be calculated when this direction is not perpendicular to the optical axis of a lens.

FIG. 10 comprises schematic diagrams showing an example of a railing object shown in a target image and an obtained evaluation value map. FIG. 10A shows an evaluation value map, FIG. 10B shows a reference image rotated through 90 degrees counterclockwise, and FIG. 10C shows a minimal value distribution obtained by extracting part of the evaluation value map. Even when the direction in which the rails of a railing are consecutive is perpendicular to the optical axis of a lens, an evaluation value map is generated as oblique lines that are not parallel to the Xb axis of the evaluation value map, and therefore it is possible to extract a line indicating true disparity by performing a Hough transform for linear components of the oblique lines.

Therefore, it is possible to calculate a true distance even when the direction in which the rails of a railing are consecutive is not perpendicular to the optical axis of a lens, as shown in FIG. 10.

Disparity data output section 103 calculates difference d between an Xr coordinate point in a reference image of a corresponding point calculated by corresponding point determination section 108, and an Xb coordinate point in a reference image of a predetermined target point, takes this as disparity d at that predetermined target point, and outputs this result as disparity data.

As described above, according to this embodiment, true disparity can be calculated for the case of an object that includes consecutive similar patterns by superimposing information of another target point present in a peripheral area of a target point in a reference image.

Here, a case in which the optical axis of a stereo camera and an object are perpendicular has been described, but application is also possible when these are not perpendicular, and does not depend on the position of an object that includes consecutive similar patterns. Specifically, application is possible not only to a railing or guardrail positioned directly in front of a stereo camera, but also to a railing or guardrail positioned obliquely.

While a Hough transform has been used here, another method of extracting a straight line may also be used, such as Canny edge detection or the like, and the method is not a limitation on the present invention.

Here, an arbitrary line may be calculated using dynamic programming in order to calculate arbitrary lines that are consecutive in the Xb axis direction. Also, calculating minimal-evaluation-value arbitrary consecutive lines using dynamic programming is only an example, and arbitrary consecutive lines may also be derived using a method other than dynamic programming. When an arbitrary line is calculated using dynamic programming, true disparity can be calculated not only when an object in which similar patterns are consecutive continues in a straight line, but also in the case of a curved line that follows the curve of a road.

Here, a method has been described whereby minimal values of the evaluation value distribution shown in FIG. 6C are extracted, the minimal value distribution shown in FIG. 6D is generated, and the evaluation value map shown in FIG. 8D is calculated, but an evaluation value map may also be calculated using an evaluation value distribution itself comprising degree of difference values instead of a minimal value distribution.

Such a case differs in that the evaluation value map shown in FIG. 8 comprises multiple values indicating a degree of difference instead of binary values of 0 and −1, but is the same in that the processing performed by corresponding point determination section 108 is calculating a straight line in which points for which the evaluation value is small are consecutive in a straight line. If troughs of low evaluation value points are connected in an evaluation value map when an evaluation value distribution itself comprising degree of difference values is used, the result is similar to FIG. 8D.

Embodiment 2

In Embodiment 1, a description has been given of providing a target point (xb1,yb1) peripheral area in the horizontal direction on the Xb axis, and calculating an evaluation value map based on a minimal value distribution for each target point present in the peripheral area, but an evaluation value map may also be calculated based on a minimal value distribution for each target point present in a peripheral area after superimposing positions located in the vertical direction on the Yb axis of target point (xb1,yb1), or a minimal value distribution of a plurality of target points, as shown in FIG. 11.

Figure 11B:
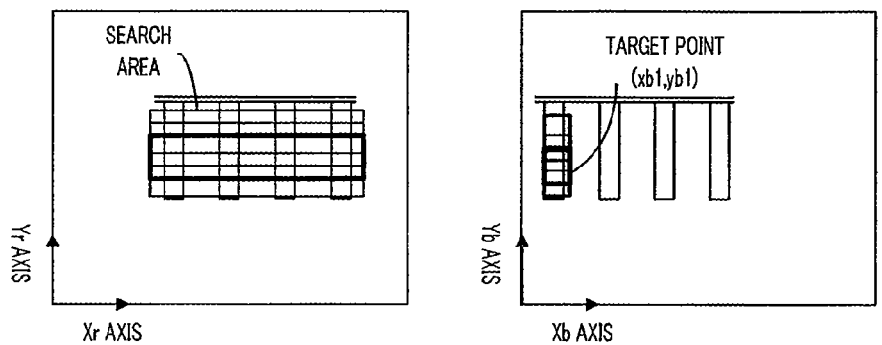
Figure 11C:
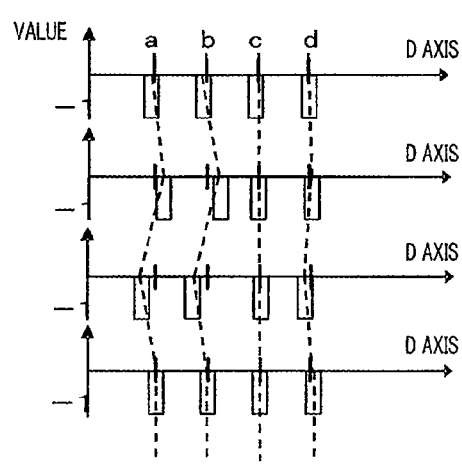
Figure 11D:
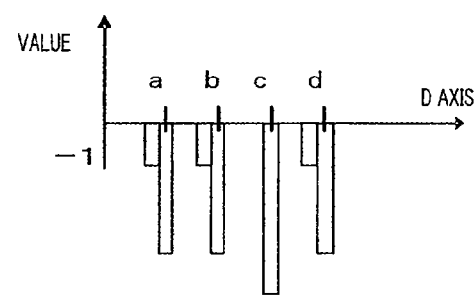
Figure 12:
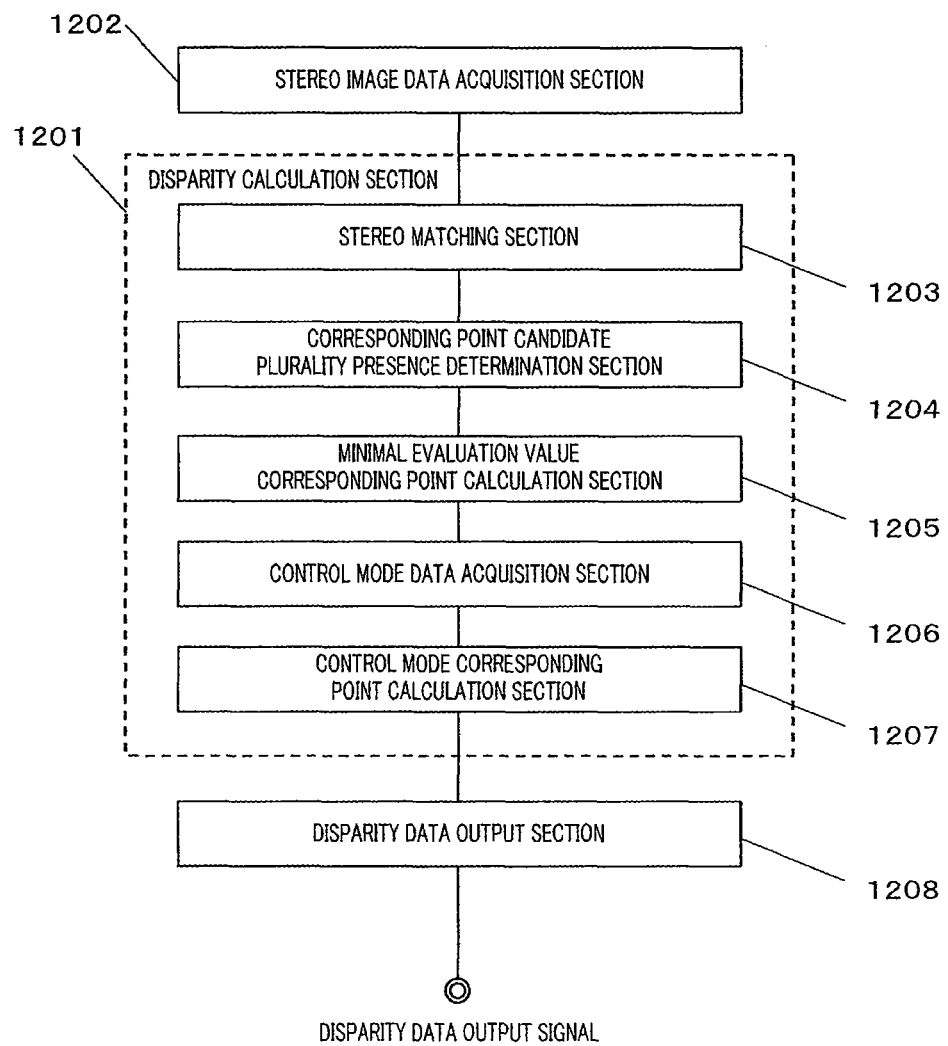
FIG. 12 is a drawing showing a block configuration of a conventional disparity calculation apparatus.

FIG. 11 comprises schematic diagrams showing evaluation value distribution superposition. FIG. 11A is a drawing showing a plurality of target points in a target image, FIG. 11B is a drawing showing a search area for each target point in a reference image, FIG. 11C is a drawing showing an evaluation value distribution for each target point, and FIG. 11D is a drawing showing the result of superposing the evaluation value distributions.

When an evaluation value map generated by superposing minimal values is used as shown in FIG. 11D, greater robustness to noise is achieved, and linear accuracy is thereby improved.

The result of superposing the components of minimal value distribution Hm(Xb) for each peripheral target point is used as an evaluation value distribution.

Here, in a case in which R denotes the number of components of an evaluation value distribution, the equation for calculating evaluation value distribution H(Xb) by superposition of minimal value distribution Hm1(Xb) for a target point and minimal value distribution HmR(Xb) for a target point present in the vertical direction in a target image is shown in equation 3.

[3]

$$H_i(Xb)=Hm1_i(Xb)+Hm2_i(Xb) \quad i=1,\ldots,R \qquad \text{(Equation 3)}$$

As described above, by calculating an evaluation value map based on a minimal value distribution for each target point present in a peripheral area after superimposing a minimal value distribution of another target point present in the vertical direction of target point (xb1,yb1), an effect of improving the accuracy of corresponding point extraction is achieved.

Embodiment 3

In Embodiment 1, a description was given of setting a peripheral area of target point (xb1,yb1) in an arbitrary range in the horizontal direction on the Xb axis, and calculating an evaluation value map based on a minimal value distribution for each target point present in the peripheral area, but the horizontal-direction width of a target point (xb1,yb1) peripheral area may also be made a predetermined width.

In this embodiment, the horizontal-direction width of a peripheral area is decided with an area up to another target point having an evaluation value distribution pattern similar to an evaluation value distribution pattern for target point (xb1,yb1) as a peripheral area.

When setting the horizontal-direction width of a peripheral area, evaluation value map calculation section 107 determines similarity between a minimal value distribution for each target point present in the horizontal direction of target point (xb1,yb1) and a minimal value distribution for target point (xb1,yb1). Similarity is determined by means of a sum of differences for each element of the minimal value distributions or the like, and the minimal value distributions are determined to be similar if the sum of differences is smaller than a predetermined threshold value.

Then evaluation value map calculation section 107 decides upon an area that includes a minimal value distribution determined to be similar as a peripheral area, and calculates an evaluation value map.

With regard to a peripheral area of a target point, the accuracy of corresponding point extraction is increased by making a setting for all target objects for which distance (disparity) is the same including a target point. The reason for this is that the probability of estimating a true disparity value is increased by including target points with the same disparity as a peripheral area, and the probability of estimating a true disparity value decreases if target points having different disparity values are included.

This can also be applied in a similar way to the case in which a peripheral area is extended in the vertical direction of target point (xb1,yb1) described in Embodiment 2, enabling the accuracy of corresponding point extraction to be improved.

The disclosure of Japanese Patent Application No. 2009-205466, filed on Sep. 7, 2009, including the specification, drawings and abstract, is incorporated herein by reference in its entirety.

INDUSTRIAL APPLICABILITY

A disparity calculation apparatus according to the present invention has a function of enabling a true distance to be calculated for a repetitive pattern for which distance calculation is difficult in principle in stereo matching, and is useful as a pre-crash safety aid, a parking aid when parking in a parking lot, and so forth.

REFERENCE SIGNS LIST

100 Disparity calculation apparatus
101 Disparity calculation section
102 Stereo image data acquisition section
103 Disparity data output section
104 Stereo matching section
105 Corresponding point candidate number determination section
106 Minimal value distribution calculation section
107 Evaluation value map calculation section
108 Corresponding point determination section
1201 Disparity calculation section
1202 Stereo image data acquisition section
1203 Stereo matching section
1204 Corresponding point candidate plurality presence determination section
1205 Minimal evaluation value corresponding point calculation section
1206 Control mode data acquisition section
1207 Control mode corresponding point calculation section
1208 Disparity data output section

The invention claimed is:

1. A disparity calculation apparatus, comprising:
an input mode that receives data of a target image and data of a reference image from a stereo camera; and
a control circuitry,
wherein the control circuitry is operative to:
calculate a degree of difference of image brightness between a target point included in the target image and each of a plurality of search points included in the reference image corresponding to the target point;
detect, as a corresponding point candidate from the plurality of search points, the search point for which the degree of difference of image brightness is minimal in a coordinate distribution of the plurality of search points, and determine if a plurality of the detected search points are present;
extract, when the number n (where n is integer equal to or greater than two) of first corresponding point candidates and the number m (where m is integer smaller than n) of second corresponding point candidates are different, a corresponding point from the first corresponding point candidates by eliminating the first corresponding point candidate for which the second corresponding point candidate with a corresponding disparity value for the target value does not exist, the first corresponding point candidates corresponding to a first target point determined as a target point for which a plurality of the corresponding point candidates exist, the second corresponding point candidates corresponding to a second target point existing in a peripheral area including the first target point; and
output disparity data calculated based on a coordinate point of the corresponding point corresponding to the first target point and a coordinate point of the first target point.

2. The disparity calculation apparatus according to claim 1, wherein the control circuitry is operative to determine, when a plurality of the first corresponding point candidates that are not eliminated are present, the first corresponding point candidate for which the variation between the disparity value for the first target point and the disparity value for the second target point is smallest among the plurality of the first corresponding point candidates as the corresponding point.

3. The disparity calculation apparatus according to claim 1, wherein the control circuitry is operative to detect, as the corresponding point candidate from the plurality of search points, the search point for which the degree of difference of image brightness is equal to or smaller than a predetermined threshold value.

4. A disparity calculation method, comprising:
receiving data of a target image and data of a reference image from a stereo camera;
calculating a degree of difference of image brightness between a target point included in the target image and a plurality of search points included in the reference image corresponding to the target point;
detecting, as a corresponding point candidate from the plurality of search points, a search point for which the degree of difference of image brightness is minimal in a coordinate distribution of the plurality of search points, and determining if a plurality of the detected search points are present;
extracting, when the number n (where n is integer equal to or greater than two) of first corresponding point candidates and the number m (where m is integer smaller than n) of second corresponding point candidates are different, a corresponding point from the first corresponding point candidates by eliminating the first corresponding point candidate for which the second corresponding point candidate with a corresponding disparity value for the target value does not exist, the first corresponding point candidates corresponding to a first target point determined as a target point for which a plurality of the corresponding point candidates exist, the second corresponding point candidates corresponding to a second target point existing in a peripheral area including the first target point; and
outputting disparity data calculated based on a coordinate point of the corresponding point corresponding to the first target point and a coordinate point of the first target point.

* * * * *